(12) United States Patent
Chen et al.

(10) Patent No.: US 11,468,210 B2
(45) Date of Patent: Oct. 11, 2022

(54) METHODS, SYSTEMS, AND MEDIA FOR GENERATIVE URBAN DESIGN WITH SPREADSHEET AND MODEL INTEGRATION FEATURES

(71) Applicant: Sidewalk Labs LLC, New York, NY (US)

(72) Inventors: Difei Chen, New York, NY (US);
Douwe Osinga, New York, NY (US);
Okalo Ikhena, New York, NY (US);
Violet Whitney, New York, NY (US);
Jack Amadeo, New York, NY (US)

(73) Assignee: Sidewalk Labs LLC, New York, NY (US)

( * ) Notice: Subject to any disclaimer, the term of this patent is extended or adjusted under 35 U.S.C. 154(b) by 0 days.

(21) Appl. No.: 17/497,548

(22) Filed: Oct. 8, 2021

(65) Prior Publication Data
US 2022/0114294 A1 Apr. 14, 2022

Related U.S. Application Data

(60) Provisional application No. 63/089,696, filed on Oct. 9, 2020.

(51) Int. Cl.
*G06F 17/10* (2006.01)
*G06F 30/13* (2020.01)
(Continued)

(52) U.S. Cl.
CPC .............. *G06F 30/13* (2020.01); *G06F 30/20* (2020.01); *G06F 40/18* (2020.01); *G06F 2111/04* (2020.01)

(58) Field of Classification Search
CPC ...... G06F 30/13; G06F 30/20; G06F 2111/04; G06F 40/18
(Continued)

(56) References Cited

U.S. PATENT DOCUMENTS

2002/0018068 A1 2/2002 Baumann
2002/0091990 A1 7/2002 Little et al.
(Continued)

OTHER PUBLICATIONS

Beirao et al. (implementing a generative urban design model, 10 pages). (Year: 2010).*
(Continued)

*Primary Examiner* — Andre Pierre Louis
(74) *Attorney, Agent, or Firm* — Byrne Poh LLP (57) ABSTRACT

Methods, systems, and media for generative urban design with spreadsheet and model integration features are provided. In some embodiments, the method comprises: receiving one or more design constraints and one or more inputs for generating one or more proposed district designs; generating a plurality of design options that meet the one or more design constraints and the one or more inputs using a generative design system, wherein each of the plurality of design options include geometric data for a district design; automatically generating a global spreadsheet having a plurality of sheets that connects the geometric data from each of the plurality of design options to a plurality of received user-created models, wherein first sheets of the plurality of sheets are generated to include each of the plurality of user-created models, wherein second sheets of the plurality of sheets are generated to include the geometric data for each of the plurality of design options, wherein third sheets of the plurality of sheets are configured to convert values from the geometric data in the second sheets to values required by each of plurality of user-created models; receiving outputs from each of the plurality of user-generated models using the converted values in the third sheets of the global spreadsheet; and transmitting the outputs from each of the plurality of user-generated models to the generative design system.

18 Claims, 3 Drawing Sheets

(51) Int. Cl.
  *G06F 40/18* (2020.01)
  *G06F 30/20* (2020.01)
  *G06F 111/04* (2020.01)
(58) Field of Classification Search
  USPC .......................................................... 703/2
  See application file for complete search history.

(56) References Cited

U.S. PATENT DOCUMENTS

| | | |
|---|---|---|
| 2012/0226967 A1 | 9/2012 | Oh |
| 2013/0013993 A1 | 1/2013 | Oh |
| 2013/0283228 A1 | 10/2013 | Sun |
| 2019/0147117 A1* | 5/2019 | Benjamin ............ G06Q 50/165 703/1 |

OTHER PUBLICATIONS

Beirao, J. et al., "Implementing a Generative Urban Design Model: Grammar-based design patterns for urban design", in Proceedings of Future Cities, 28th eCAADe Conference, Sep. 15-18, 2010, Zurich, Switzerland, pp. 265-274.

International Search Report and Written Opinion dated Jan. 18, 2022 in International Patent Application No. PCT/US2021/054236, pp. 1-29.

* cited by examiner

METHODS, SYSTEMS, AND MEDIA FOR GENERATIVE URBAN DESIGN WITH SPREADSHEET AND MODEL INTEGRATION FEATURES

CROSS-REFERENCE TO RELATED APPLICATIONS

This application claims the benefit of U.S. Provisional Patent Application No. 63/089,696, filed Oct. 9, 2020, which is hereby incorporated by reference herein in its entirety.

TECHNICAL FIELD

The disclosed subject matter relates to methods, systems, and media for generative urban design with spreadsheet and model integration features. More particularly, the disclosed subject matter relates to integrating a model defined in a spreadsheet into a generative design system, where geometric data from the generative design system is automatically tied or otherwise associated with user-defined logic and other data contained within the spreadsheet.

BACKGROUND

When designing a new neighborhood, planners, architects, and developers must weigh a wide range of competing objectives that impact quality of life. For example, increased density can generate more jobs and more housing options, but it can also mean more traffic congestion or taller buildings that cast shadows onto public spaces.

A holistic understanding of these tradeoffs is critical, since the built environment is very difficult to change, and communities must live with these choices for years to come. But planning work can be remarkably fragmented, lengthy, and costly, making it hard for professionals—let alone communities—to fully evaluate and understand all of their options.

Currently, the various experts on a planning team often run separate analyses to produce a neighborhood design: an architect uses one type of software to simulate sunlight, an engineer uses another to plan streets, a real estate developer models economics in a spreadsheet, and so on. The time and cost needed to coordinate all of these competing elements often means a project can only afford to develop a handful of designs for the project team, with limited insight into how these options will impact the community.

Moreover, when working with these various experts on a planning team, each expert may want to access or provide data to another expert's model or to an overall design system. In the example above, a generative design tool would preferably have access and provide data to the sunlight model created by the architect, the street grid model created by the engineer, the economic model created by the real estate developer, etc. In order to do this, current approaches require that (1) the expert needing access to a model re-implement the model in their system or (2) the expert that created the model provide access to the model through an application programming interface (API). Both of these approaches are labor intensive.

Even further, in many instances, these models are implemented in the form of a spreadsheet and having multiple scenarios in such a spreadsheet is cumbersome. When using machine learning and computation design in a generative design system to generate billions of comprehensive planning scenarios, this compounds the problem of using one or more spreadsheets that each contain a model that requires data from the generative design system.

Accordingly, it is desirable to provide new methods, systems, and media for generative urban design with spreadsheet and model integration features.

SUMMARY

Methods, systems, and media for generative urban design with spreadsheet and model integration features are provided.

In accordance with some embodiments of the disclosed subject matter, a method for integrating models with generative design systems is provided, the method comprising: receiving, by a hardware processor, one or more design constraints and one or more inputs for generating one or more proposed district designs; generating, by the hardware processor, a plurality of design options that meet the one or more design constraints and the one or more inputs using a generative design system, wherein each of the plurality of design options include geometric data for a district design; automatically generating, by the hardware processor, a global spreadsheet having a plurality of sheets that connects the geometric data from each of the plurality of design options to a plurality of received user-created models, wherein first sheets of the plurality of sheets are generated to include each of the plurality of user-created models, wherein second sheets of the plurality of sheets are generated to include the geometric data for each of the plurality of design options, wherein third sheets of the plurality of sheets are configured to convert values from the geometric data in the second sheets to values required by each of plurality of user-created models; receiving, by the hardware processor, outputs from each of the plurality of user-generated models using the converted values in the third sheets of the global spreadsheet; and transmitting, by the hardware processor, the outputs from each of the plurality of user-generated models to the generative design system.

In some embodiments, the method further comprises transmitting a request that the generative design system generate updated design options based on the outputs from each of the plurality of user-generated models, wherein each of the updated design options includes updated geometric data for the district design. In some embodiments, the method further comprises modifying the global spreadsheet to replace the geometric data with the updated geometric data.

In some embodiments, each of the plurality of user-created models includes one or more values that are required by each of the plurality of user-created models, one or more user-specified calculations that are used by each of the plurality of user-created models, and one or more user-specified rules that are applied by each of the plurality of user-created models.

In some embodiments, the geometric data in the second sheets of the global spreadsheet are extracted from each resource of the generative design system into a table and copied into the second sheets of the global spreadsheet.

In some embodiments, the third sheets are positioned in the global spreadsheet between the first sheets and the second sheets.

In accordance with some embodiments of the disclosed subject matter, a system for integrating models with generative design systems is provided, the system comprising a hardware processor that is configured to: receive one or more design constraints and one or more inputs for generating one or more proposed district designs; generate a plurality of design options that meet the one or more design constraints and the one or more inputs using a generative design system, wherein each of the plurality of design options include geometric data for a district design; automatically generate a global spreadsheet having a plurality of sheets that connects the geometric data from each of the plurality of design options to a plurality of received user-created models, wherein first sheets of the plurality of sheets are generated to include each of the plurality of user-created models, wherein second sheets of the plurality of sheets are generated to include the geometric data for each of the plurality of design options, wherein third sheets of the plurality of sheets are configured to convert values from the geometric data in the second sheets to values required by each of plurality of user-created models; receive outputs from each of the plurality of user-generated models using the converted values in the third sheets of the global spreadsheet; and transmit the outputs from each of the plurality of user-generated models to the generative design system.

In accordance with some embodiments of the disclosed subject matter, a non-transitory computer-readable medium containing computer executable instructions that, when executed by a processor, cause the processor to perform a method for integrating models with generative design systems is provided, the method comprising: receiving one or more design constraints and one or more inputs for generating one or more proposed district designs; generating a plurality of design options that meet the one or more design constraints and the one or more inputs using a generative design system, wherein each of the plurality of design options include geometric data for a district design; automatically generating a global spreadsheet having a plurality of sheets that connects the geometric data from each of the plurality of design options to a plurality of received user-created models, wherein first sheets of the plurality of sheets are generated to include each of the plurality of user-created models, wherein second sheets of the plurality of sheets are generated to include the geometric data for each of the plurality of design options, wherein third sheets of the plurality of sheets are configured to convert values from the geometric data in the second sheets to values required by each of plurality of user-created models; receiving outputs from each of the plurality of user-generated models using the converted values in the third sheets of the global spreadsheet; and transmitting the outputs from each of the plurality of user-generated models to the generative design system.

In accordance with some embodiments of the disclosed subject matter, a system for integrating models with generative design systems is provided, the system comprising: means for receiving one or more design constraints and one or more inputs for generating one or more proposed district designs; means for generating a plurality of design options that meet the one or more design constraints and the one or more inputs using a generative design system, wherein each of the plurality of design options include geometric data for a district design; means for automatically generating a global spreadsheet having a plurality of sheets that connects the geometric data from each of the plurality of design options to a plurality of received user-created models, wherein first sheets of the plurality of sheets are generated to include each of the plurality of user-created models, wherein second sheets of the plurality of sheets are generated to include the geometric data for each of the plurality of design options, wherein third sheets of the plurality of sheets are configured to convert values from the geometric data in the second sheets to values required by each of plurality of user-created models; means for receiving outputs from each of the plurality of user-generated models using the converted values in the third sheets of the global spreadsheet; and means for transmitting the outputs from each of the plurality of user-generated models to the generative design system.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for generative urban design with spreadsheet and model integration features.

Generally speaking, the mechanisms described herein can integrate a model that is defined in a spreadsheet into a generative design system, where geometric data from the generative design system is automatically tied or otherwise associated with user-defined logic and other data contained within the spreadsheet.

Figure 1:
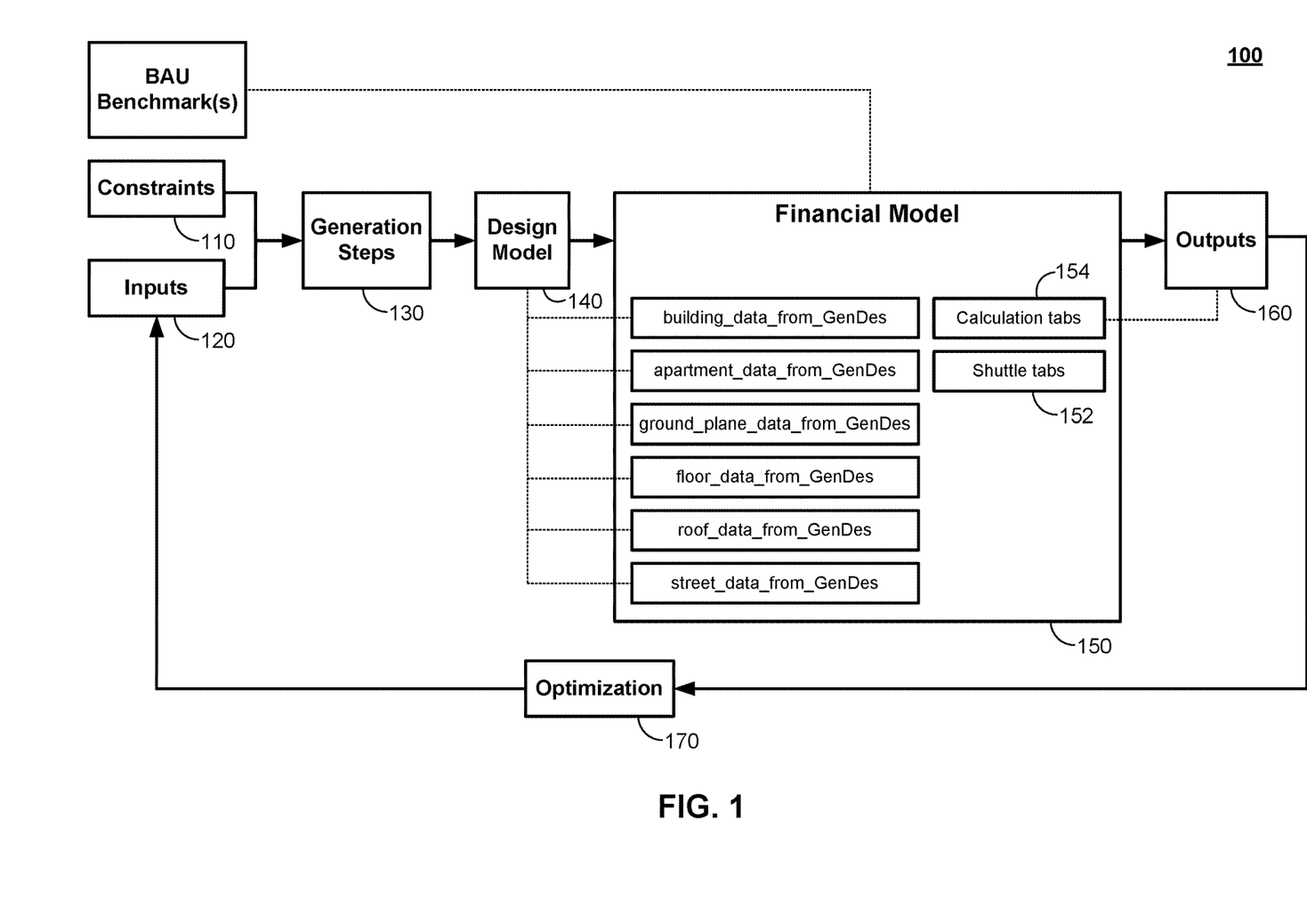
FIG. 1 shows an illustrative example of a generative design system with spreadsheet and model integration features in accordance with some embodiments of the disclosed subject matter.

Turning to FIG. 1, the generative design system 100 can receive one or more design constraints at 110 and one or more design inputs at 120. For example, the one or more design constraint received at 110 can include geometrical restrictions according to which the design options must be designed. In a more particular example, one design constraint can indicate the physical boundaries within which the design option, such as a proposed district plan or a proposed building, must reside. In continuing this example, the generative design system 100 can perform generation steps at 130 to generate, at 140, one or more design options that meet the specific design constraints received at 110 and that meet the specific design inputs received at 120. For example, each design option at 140 can represent geometric data for a district design.

In some embodiments, the generative design system 100 can create a global spreadsheet that ties the geometric data from the one or more design options to one or more models. This can, for example, integrate one or more models that are provided by entities outside of the generative design system 100 into the simulation that continue to generate design options or alternatives.

It should be noted that, in some embodiments, a global spreadsheet 150 can be created for each design option that is generated by the generative design system 100. For example, when the global spreadsheet 150 of FIG. 1 is a financial model used to calculate construction costs for a proposed district, a financial model in the form of a global spreadsheet can be created for each design variant or design iteration of the generative design system 100.

In some embodiments, a generative design system can receive a model that has been created in a spreadsheet. For example, such a model can include one or more values that are required by the model, one or more user-specified formulas that are used by the model, one or more user-specified business rules that are applied by the model. It should be noted that any suitable model can be received, such as cost models, financial models, economic models, transit models, etc. It should also be noted that a model that has been created in a spreadsheet can be received from any suitable entity (e.g., a real estate developer, an architect, an engineer, a consultant or subconsultant, etc.).

Upon receiving the above-mentioned user-created model that has been defined in a spreadsheet, the generative design system can reserve the first N sheets of the global spreadsheet for the user-created model. In the instance in which a financial model for calculating the construction costs for a proposed district is received as a spreadsheet, the received spreadsheet for the financial model can include multiple subsheets, such as one that calculates the costs for building a floor including the walls around that floor, the internal spaces around that floor, and other cost aspects of building that floor. The global spreadsheet can copy and otherwise incorporate the financial model in the first N sheets of the global spreadsheet.

It should be noted that, although the embodiments described above generally relate to a financial model that is provided in the form of a spreadsheet in which the financial model can be used to calculate the costs for building every floor in the proposed district, this is merely illustrative. The financial model can include approaches for calculating the cost for building parking in the proposed district, building and/or maintaining parks and other green space in the proposed district, building and/or maintaining the roads in the proposed district, etc.

In some embodiments, the generative design system can provide the geometric data from the generated design option to the global spreadsheet 150. For example, the generative design system can reserve the last M sheets of the global spreadsheet 150 to incorporate the geometric data from the generated design option. For example, the last M sheets of the global spreadsheet 150 can be set aside for dumps of resources coming from the generative design system. In a more particular example, geometric data from the generated design option is published to specifically-named data tabs in the global spreadsheet 150, where the geometric data is copied to a set of shuttle tabs at 152 with fixed headers in the global spreadsheet 150. In continuing the example above, geometric data and/or any other actual data from the generated design option is published to specifically-named data tabs at the end of the global spreadsheet 150.

It should be noted that each resource of the generative design system can be converted into a table and copied without modification into such a sheet. For example, one of the last M sheets can provide, from the geometric data, data on all generated streets in a proposed district (e.g., "street_data_from_GenDes" in FIG. 1). In continuing this example for a sheet containing all street data of a proposed district design, each street can occupy one row in the sheet and a number of different properties of each street can make up the columns of the sheet.

Examples of these different properties can be, for example, street type, maximum speed, length, etc. In another example, the data from the generated design option can include floor area information, facade area information, open space area information, etc.

As shown in FIG. 1, other sheets in the last M sheets can provide building data on generated buildings in the proposed district (e.g., "building_data_from_GenDes"), apartment data on generated units within the buildings in the proposed district (e.g., "apartment_data_from_GenDes"), ground plane data (e.g., "ground_plane data_from_GenDes"), floor data that can include floor type, floor layouts, floor dimensions, etc. on generated floors within the buildings in the proposed district (e.g., "floor_data_from_GenDes"), and roof data for generated buildings in the proposed district (e.g., "roof_data_from_GenDes").

In some embodiments, the generative design system can create multiple middle sheets between the first N sheets and the last M sheets of the global spreadsheet 150 that convert the values from the set of M sheets to the values required by the model defined in the first N sheets. To continue the above example in which streets data in a generated design option is provided in one of the M sheets and a financial model is provided in one of the N sheets, one of the created middle sheets in the global spreadsheet 150 can aggregate the data by looking up the cost per meter for a particular street type and multiplying that by the length of the street and then grouping this by street type, effectively creating a table that, for each street type, has the total cost to build all streets in the proposed district for that street type. The values of this table in the middle sheets can then be consumed by the financial model. For example, as shown in FIG. 1, a set of calculation tabs 154 can be created in the global spreadsheet 150 in which custom calculations can be applied to the resulting takeoffs to estimate cost, value, and/or profit. As also shown in FIG. 1, the results from the calculation tabs 154 can then be fed back into the generative design system at outputs 160.

In a more particular example, the first sheet of the global spreadsheet 150 can provide a user of the generative design system with the economic performance of the proposed district having the district design output by the generative design system in which data from the design option that was generated by the generative design system was incorporated into sheets of a global spreadsheet, the data from the design option (e.g., such as gross floor area information, facade area information, open space area information, etc.) was converted and/or aggregated into another set of sheets of the global spreadsheet, the converted and/or aggregated data from the design option was applied to a financial model on yet another set of sheets of the global spreadsheet.

It should be noted that, although the embodiments described herein generally relate to financial models and economic performance of a proposed district, the global spreadsheet can be used for any suitable calculation. For example, while previous district calculations may have assumed that the amount of solar energy produced by a district was constant, the global spreadsheet described herein can be used to calculate the amount of solar energy produced by a proposed district for each of the locations and/or services in which solar panels can be installed over a particular period of time (e.g., solar performance over an entire year), thereby allowing the generative design system to indicate, for each design variant, how much battery capacity would be needed by a district that was configured as described in the design variant. In a more particular example, a spreadsheet for calculating energy consumption of a proposed district can be received from a user and raycasting calculations along with additional data from the proposed district can be used to calculate the amount of solar energy produced by a proposed district for each of the locations and/or services based on raycasting calculations, thereby allowing the generative design system to indicate, for each design variant, how much battery capacity would be needed by a district that was configured as described in the design variant.

At 170, the generative design system can continue to optimize the generated design options based on the current design option, the geometric data from the current design option, and the calculations that result from the intersection of the geometric data of the current design option with a model that is defined in a received spreadsheet. For example, based at least in part on the calculations that result from the intersection of the geometric data of the current design option with a model that is defined in a received spreadsheet, the generative design system can update its design model to generate one or more new design options.

Figure 2:
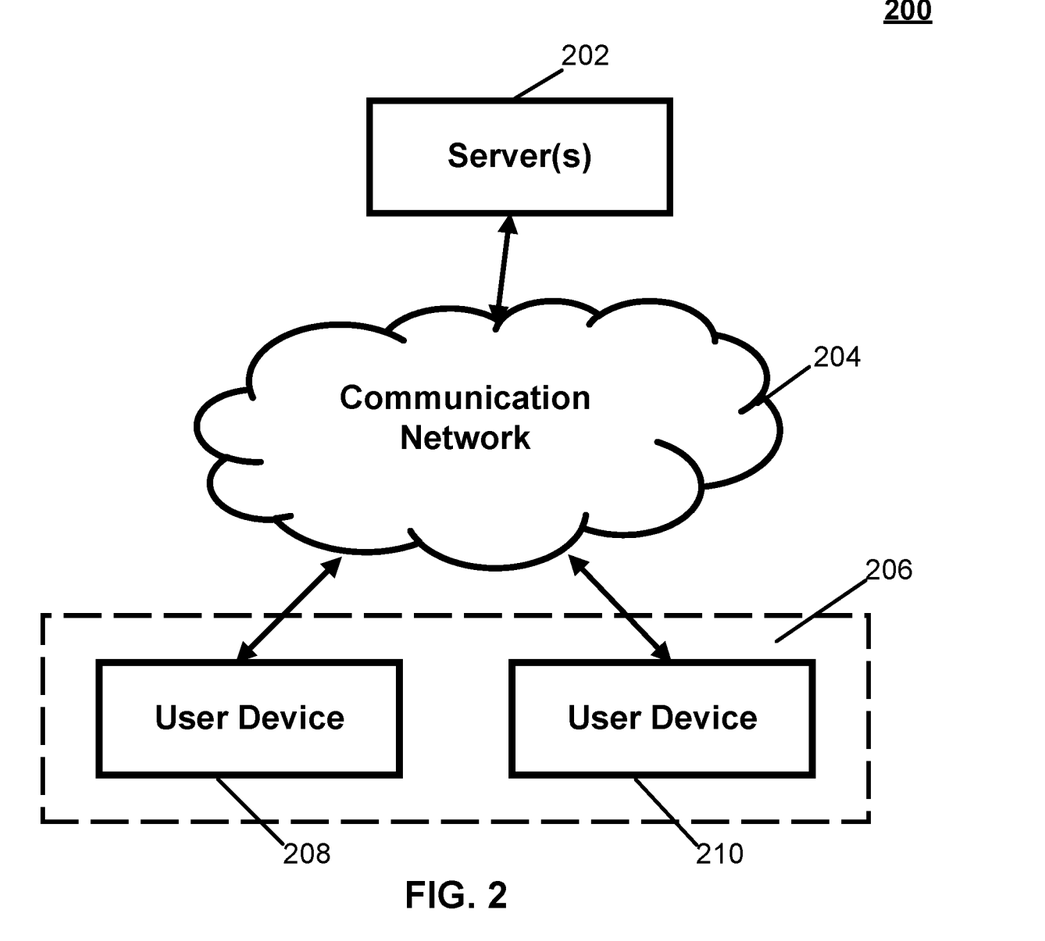
FIG. 2 shows a schematic diagram of an illustrative system suitable for implementation of mechanisms described herein for generative design with spreadsheet and model integration features in accordance with some embodiments of the disclosed subject matter.

Turning to FIG. 2, an example 200 of hardware for a generative design with spreadsheet and model integration features that can be used in accordance with some embodiments of the disclosed subject matter is shown. As illustrated, hardware 200 can include a server 202, a communication network 204, and/or one or more user devices 206, such as user devices 208 and 210.

In some embodiments, server 202 can be any suitable server for storing data and/or programs, executing programs (e.g., generating one or more design options that meet the specified design constraints and design inputs, receiving a model that is defined in a spreadsheet, executing a generative design, generating a global spreadsheet that integrates the model with the geometric data from a generated design option, and passes calculations that result from the intersection of the geometric data of the current design option with a model that is defined in a received spreadsheet back to the generative design system, as described above in connection with FIG. 1), and/or for any other suitable function(s). For example, in some embodiments, server 202 can store a global spreadsheet that corresponds to each generated design option, a model that is defined in a received spreadsheet, variants or design options generated by the generative design system, and/or any other suitable type of information that can be used for generating new variants. As another example, in some embodiments, server 202 can store a program used for a generative design system with spreadsheet and model integration features, as described above in connection with FIG. 1. Note that, in instances in which server 202 executes a program or an algorithm for a generative design system with spreadsheet and model integration features, server 202 can receive any suitable design constraints or design inputs from user device 206. In some embodiments, server 202 can be omitted.

Communication network 204 can be any suitable combination of one or more wired and/or wireless networks in some embodiments. For example, communication network 204 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links to communication network 204 that can be linked via one or more communications links to server 202. The communications links can be any communications links suitable for communicating data among user devices 206 and server 202, such as network links, dial-up links, wireless links, hard-wired links, any other suitable communications links, or any suitable combination of such links.

User devices 206 can include any one or more user devices suitable for storing data or programs, executing programs, transmitting design constraints, design inputs, or instructions to server 202, presenting user interfaces that provide one or more design options (e.g., as shown in and described above in connection with FIG. 1), and/or for performing any other suitable function(s). For example, in some embodiments, user devices 206 can include a desktop computer, a laptop computer, a mobile phone, a tablet computer, and/or any other suitable type of user device.

Although server 202 is illustrated as one device, the functions performed by server 202 can be performed using any suitable number of devices in some embodiments. For example, in some embodiments, multiple devices can be used to implement the functions performed by server 202.

Although two user devices 208 and 210 are shown in FIG. 2 to avoid over-complicating the figure, any suitable number of user devices, and/or any suitable types of user devices, can be used in some embodiments.

Server 202 and user devices 206 can be implemented using any suitable hardware in some embodiments. For example, in some embodiments, server 202 and user devices 206 can be implemented using any suitable general purpose computer or special purpose computer. For example, a mobile phone may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Figure 3:
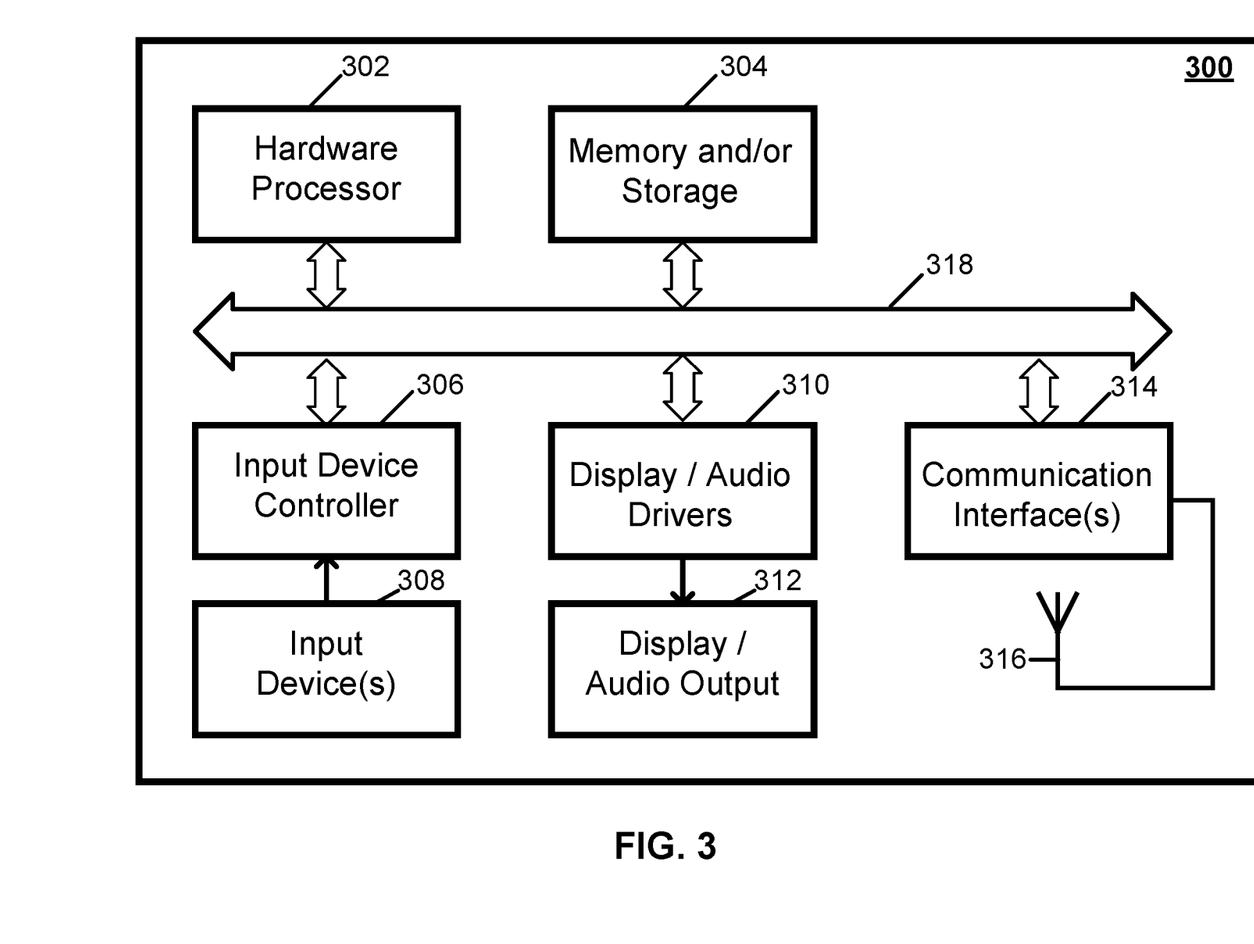
FIG. 3 shows a detailed example of hardware that can be used in a server and/or a user device of FIG. 2 in accordance with some embodiments of the disclosed subject matter.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage of a server, such as server 202. In some embodiments, hardware processor 302 can be controlled by a computer program stored in memory and/or storage 304 of user device 206.

Memory and/or storage 304 can be any suitable memory and/or storage for storing programs, data, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks (e.g., computer network 204). For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

In some embodiments, at least some of the above described blocks of the processes of FIG. 1 can be executed or performed in any order or sequence not limited to the order and sequence shown in and described in connection with the figure. Also, some of the above blocks of FIG. 1 can be executed or performed substantially simultaneously where appropriate or in parallel to reduce latency and processing times. Additionally or alternatively, some of the above described blocks of the process of FIG. 1 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for generative design with spreadsheet and model integration features are provided.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for integrating models with generative design systems, the method comprising:
receiving, by a hardware processor, one or more design constraints and one or more inputs for generating one or more proposed district designs;
generating, by the hardware processor, a plurality of design options that meet the one or more design constraints and the one or more inputs using a generative design system, wherein each of the plurality of design options include geometric data for a district design;
automatically generating, by the hardware processor, a global spreadsheet having a plurality of sheets that connects the geometric data from each of the plurality of design options to a plurality of received user-created models, wherein first sheets of the plurality of sheets are generated to include each of the plurality of user-created models, wherein second sheets of the plurality of sheets are generated to include the geometric data for each of the plurality of design options, wherein third sheets of the plurality of sheets are configured to convert values from the geometric data in the second sheets to values required by each of plurality of user-created models;
receiving, by the hardware processor, outputs from each of the plurality of user-generated models using the converted values in the third sheets of the global spreadsheet; and
transmitting, by the hardware processor, the outputs from each of the plurality of user-generated models to the generative design system.

2. The method of claim 1, further comprising transmitting a request that the generative design system generate updated design options based on the outputs from each of the plurality of user-generated models, wherein each of the updated design options includes updated geometric data for the district design.

3. The method of claim 2, further comprising modifying the global spreadsheet to replace the geometric data with the updated geometric data.

4. The method of claim 1, wherein each of the plurality of user-created models includes one or more values that are required by each of the plurality of user-created models, one or more user-specified calculations that are used by each of the plurality of user-created models, and one or more user-specified rules that are applied by each of the plurality of user-created models.

5. The method of claim 1, wherein the geometric data in the second sheets of the global spreadsheet are extracted from each resource of the generative design system into a table and copied into the second sheets of the global spreadsheet.

6. The method of claim 1, wherein the third sheets are positioned in the global spreadsheet between the first sheets and the second sheets.

7. A system for integrating models with generative design systems, the system comprising:
a hardware processor that is configured to:
receive one or more design constraints and one or more inputs for generating one or more proposed district designs;
generate a plurality of design options that meet the one or more design constraints and the one or more inputs using a generative design system, wherein each of the plurality of design options include geometric data for a district design;
automatically generate a global spreadsheet having a plurality of sheets that connects the geometric data from each of the plurality of design options to a plurality of received user-created models, wherein first sheets of the plurality of sheets are generated to include each of the plurality of user-created models, wherein second sheets of the plurality of sheets are generated to include the geometric data for each of the plurality of design options, wherein third sheets of the plurality of sheets are configured to convert values from the geometric data in the second sheets to values required by each of plurality of user-created models;

receive outputs from each of the plurality of user-generated models using the converted values in the third sheets of the global spreadsheet; and transmit the outputs from each of the plurality of user-generated models to the generative design system.

8. The system of claim 7, wherein the hardware processor is further configured to transmit a request that the generative design system generate updated design options based on the outputs from each of the plurality of user-generated models, wherein each of the updated design options includes updated geometric data for the district design.

9. The method of claim 8, wherein the hardware processor is further configured to modify the global spreadsheet to replace the geometric data with the updated geometric data.

10. The system of claim 7, wherein each of the plurality of user-created models includes one or more values that are required by each of the plurality of user-created models, one or more user-specified calculations that are used by each of the plurality of user-created models, and one or more user-specified rules that are applied by each of the plurality of user-created models.

11. The system of claim 7, wherein the geometric data in the second sheets of the global spreadsheet are extracted from each resource of the generative design system into a table and copied into the second sheets of the global spreadsheet.

12. The system of claim 7, wherein the third sheets are positioned in the global spreadsheet between the first sheets and the second sheets.

13. A non-transitory computer-readable medium containing computer executable instructions that, when executed by a processor, cause the processor to perform a method for integrating models with generative design systems, the method comprising:

receiving one or more design constraints and one or more inputs for generating one or more proposed district designs;

generating a plurality of design options that meet the one or more design constraints and the one or more inputs using a generative design system, wherein each of the plurality of design options include geometric data for a district design;

automatically generating a global spreadsheet having a plurality of sheets that connects the geometric data from each of the plurality of design options to a plurality of received user-created models, wherein first sheets of the plurality of sheets are generated to include each of the plurality of user-created models, wherein second sheets of the plurality of sheets are generated to include the geometric data for each of the plurality of design options, wherein third sheets of the plurality of sheets are configured to convert values from the geometric data in the second sheets to values required by each of plurality of user-created models;

receiving outputs from each of the plurality of user-generated models using the converted values in the third sheets of the global spreadsheet; and transmitting the outputs from each of the plurality of user-generated models to the generative design system.

14. The non-transitory computer-readable medium of claim 13, wherein the method further comprises transmitting a request that the generative design system generate updated design options based on the outputs from each of the plurality of user-generated models, wherein each of the updated design options includes updated geometric data for the district design.

15. The non-transitory computer-readable medium of claim 14, wherein the method further comprises modifying the global spreadsheet to replace the geometric data with the updated geometric data.

16. The non-transitory computer-readable medium of claim 13, wherein each of the plurality of user-created models includes one or more values that are required by each of the plurality of user-created models, one or more user-specified calculations that are used by each of the plurality of user-created models, and one or more user-specified rules that are applied by each of the plurality of user-created models.

17. The non-transitory computer-readable medium of claim 13, wherein the geometric data in the second sheets of the global spreadsheet are extracted from each resource of the generative design system into a table and copied into the second sheets of the global spreadsheet.

18. The non-transitory computer-readable medium of claim 13, wherein the third sheets are positioned in the global spreadsheet between the first sheets and the second sheets.

* * * * *